United States Patent [15] 3,691,593
Glidden [45] Sept. 19, 1972

[54] DATA DIALING TRANSMITTER

[72] Inventor: Roger C. Glidden, Wenham, Mass.

[73] Assignee: The Glidden Electric Corporation

[22] Filed: July 16, 1971

[21] Appl. No.: 163,246

Related U.S. Application Data

[63] Continuation-in-part of Ser. No. 851,878, Aug. 21, 1969, Pat. No. 3,594,508.

[52] U.S. Cl. ....................179/2 DP
[51] Int. Cl. ....................H04m 11/08
[58] Field of Search ....................179/2 R, 2 DP, 2.5, 3

[56] References Cited

UNITED STATES PATENTS 3,597,543 8/1971 Mallebrein ....................179/2 DP
3,639,692 2/1972 Krasin ....................179/2.5 R

*Primary Examiner*—Ralph D. Blakeslee
*Attorney*—Clarence A. O'Brien and Harvey B. Jacobson

[57] ABSTRACT

A transmitter having a pulse coder and programmer assembly controls withdrawal of energy from the telephone lines at a reporting station to intermittently unload the lines for pulse dialing purposes and to operate a pair of oscillators during each operational cycle. The output of one of the oscillators is intermittently interrupted during the message period in accordance with a pulse code pattern. Recycling of the transmitter is selectively terminated by a return signal originating from the receiving station dialed by the transmitter.

11 Claims, 6 Drawing Figures

Roger C. Glidden

INVENTOR

BY Clarence A. O'Brien and Harvey B. Jacobson

Attorneys

Roger C. Glidden
INVENTOR.

BY Clarence A. O'Brien
and Harvey B. Jacobson
Attorneys

DATA DIALING TRANSMITTER

This invention relates to automatic reporting of monitored conditions utilizing a telephone communication system and the application is a continuation-in-part of my prior copending application U.S. Ser. No. 851,878, filed Aug. 21, 1969, now U.S. Pat. No. 3,594,508.

Various automatic dialing and message transmitting devices have been proposed for use in commercial telephone communication system. Many of such prior devices if at all practical and acceptable by the telephone utility, have required external power supplies and protective devices for the telephone lines. Because of the maintenance and component replacement requirements of such prior devices, they have not been suitable for reporting monitored conditions on a reliable standby basis. Further, many prior art devices were not fully operative in association with all types of telephone communication systems. Contact arcing and brush wear difficulties have also been encountered because of variations in electrical parameters amongst subscribing telephone locations and central exchange equipment used.

An important object of the present invention therefore is to provide a reliable automatic dialing and coded message transmitting device for reporting monitored conditions at a subscribers station through a commercial telephone communication system avoiding many of the aforementioned drawbacks of the prior art.

It is a further object of the present invention to provide certain improvements over the transmitter as disclosed and claimed in my prior copending application aforementioned.

In accordance with the present invention, an external power supply is eliminated in favor of an arrangement which involves momentary utilization of the electrical energy carried by the telephone lines without any steady drain of power therefrom during quiescent periods. By use of a switching amplifier arrangement, the apparatus of the present invention avoids the deletereous affects of slow contact breaking and arcing that have plagued automatic dialing devices heretofore employed. In one embodiment of the invention, a mechanical type of pulse coder is utilized involving a motor which is pulsed to intermittently accelerate driven coded members as well as to load the telephone lines producing the dialing pulses during a dialing period. During a following message period, the telephone lines are loaded by an increased amount below hang-up value by continuous energization of the motor and two oscillators, one of which dispatches a continuous guard tone. The output of the other oscillator is gated and the output frequency sequentially changed so as to transmit through the telephone lines a coded message to a receiving station rendered operative by the simultaneous reception of the guard tone. A return signal tone originating at the receiving station, is passed by a narrow band width filter to a shut-off receiver at the reporting station during a final interval in the programmed cycle in order to terminate recycling of the system. In the absence of a return signal, recycling begins with momentary hang-up to obtain a new dial tone signal.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 3, 6:
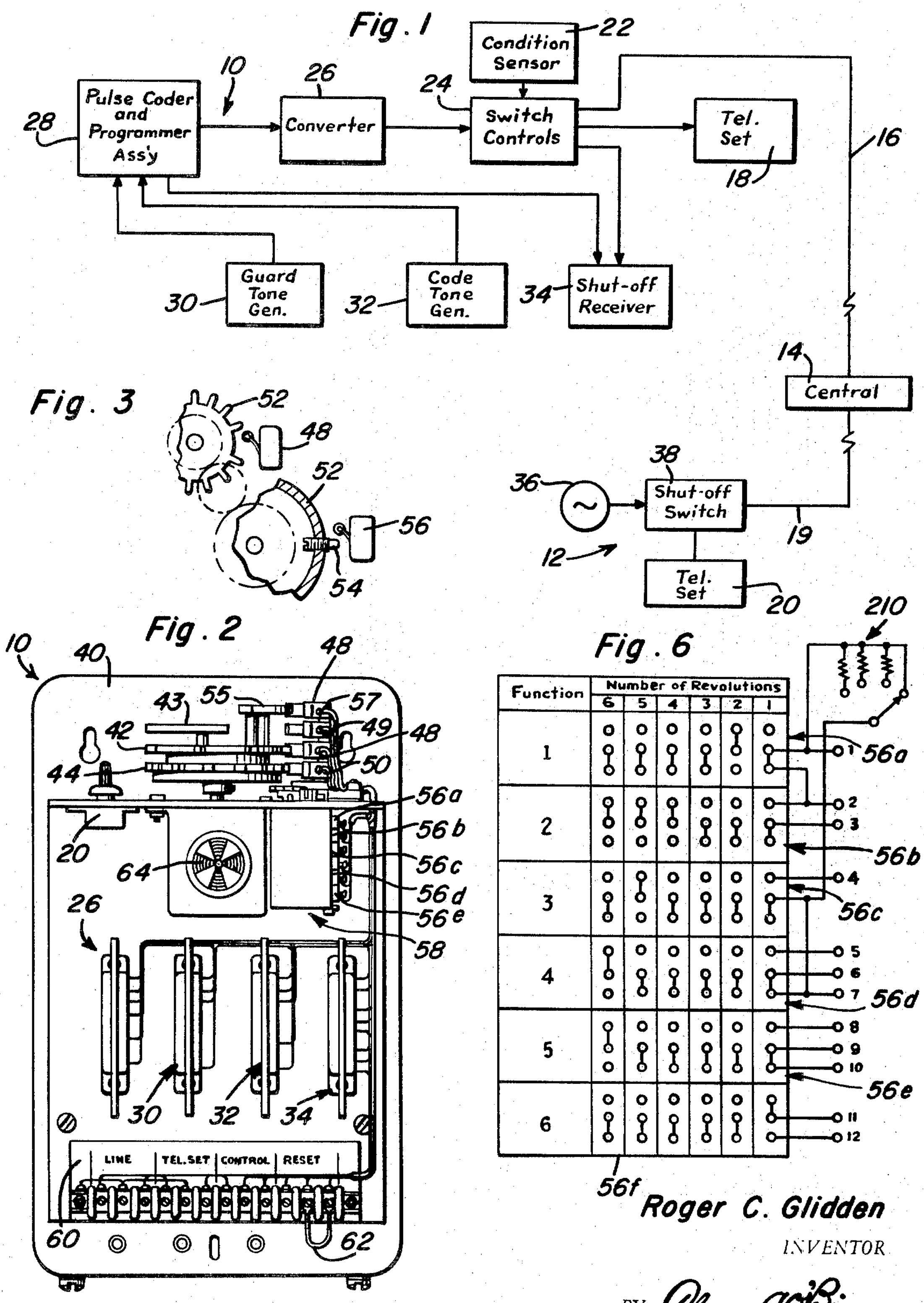
FIG. 1 is a schematic block diagram illustrating the system of the present invention.
FIG. 2 is a top plan view of a transmitter apparatus constructed in accordance with the present invention.
FIG. 3 is a partial sectional and somewhat diagrammatic view of certain operating components of the transmitter apparatus.
FIG. 6 is a diagrammatic illustration of the programming control switch arrangement associated with the transmitter apparatus.

Referring now to the drawings in detail, FIG. 1 diagrammatically illustrates the system of the present invention which includes a transmitter generally referred to by reference numeral 10 at a reporting station communicatively interlinked with apparatus generally referred to by reference numeral 12 at a receiving station by means of the usual telephone lines through a central station 14. The telephone lines 16 linking the central station with a conventional telephone set 18 at the reporting are operative in the quiescent condition of the transmitting apparatus 10 in a normal manner for communication as are the telephone lines 19 and the telephone set 20 at the receiving station. However, in accordance with the present invention, a condition such as fire, temperature, pressure, unauthorized entry, etc. being monitored at the reporting station by a condition sensor 22 is operative through the switch control component 24 to disconnect the telephone set 18 from the telephone lines and initiate an operational cycle of the transmitter. During each operational cycle, the telephone lines 16 are loaded and energy withdrawn from the telephone lines through a converter component 26 in a programmed manner determined by a pulse coder and programmer assembly 28 which is itself energized by the energy withdrawn from the telephone lines. The energy withdrawn from the telephone lines also energizes a guard tone generator 30 and a code tone generator 32 as well as a shut-off receiver 34. The assembly 28 is operative to intermittently unload the telephone lines during a dialing period in order to establish communication with the receiving station at which the apparatus 12 is located. During this dialing period as well as the subsequent message period, a guard tone signal is dispatched over the telephone lines from the generator 30 in order to set the apparatus at the receiving station into operation. During the message period, the output of the code tone generator 32 is gated or intermittently interrupted and the frequency changed in accordance with a coded pattern in order to furnish the desired information to the receiving station. During a final phase of each operational cycle, a return signal is adapted to be received by the shut-off receiver 34 in order to prevent automatic recycling of the transmitter. This return signal originates from an oscillator 36 at the receiving station which is manually or selectively set into operation by means of a shut-off switch component 38. Thus, dialing and message transmitting functions of the transmitter are repeated until the message is satisfactorily received. Also, once the condition being monitored by the sensor 22 has been corrected, the transmitter is automatically reset.

Although different types of pulse coder and programmer assemblies 28 may be utilized including solid state types, in the illustrated embodiment a mechanical type of assembly 28 is utilized having a drive motor 40 as illustrated in FIG. 2 drivingly connected to an assembly of switch actuators including a dial disc 42, a code disc 44, a frequency control sector 43 and a line opening sector 55. The motor and actuators driven thereby are suitably mounted on a frame or plate 46 on which all of the transmitter components are also mounted. The dial and code discs are operatively positioned on the frame relative to four microswitch devices 48, 49, 50 and 51. The dial and code discs may be in the form of plastic gears with some of the teeth 52 removed as shown in FIG. 3 in accordance with a coded program. Thus, rotation of the dial and code discs will produce a coded output pulse signal program the associated microswitches 48 and 50 engageable by the teeth 52. The dial and code discs driven by the motor 40 are drivingly connected through suitable gearing with a program control drum 52 as shown in FIG. 3 having threaded actuator pins 54 capable of being threadedly withdrawn or operatively positioned relative to a plurality of microswitches 56 for actuation thereof in a programmed manner. In the specific embodiment disclosed, the programmed actuator drum 52 is geared to the dial and code discs at a reduction ratio of 6:1 so that the drum undergoes one revolution for each six revolutions of the dial and code discs. The actuator pins on the program drum 52 operate six microswitches **56*a*, 56*b*, 56*c*, 56*d*, 56*e* and 56*f* forming part of the program control means 58 as shown in FIG. 2**.

The mounting plate 46 of the transmitter as shown in FIG. 2 also mounts circuit boards on which the circuitry associated with the converter 26, generators 30 and 32 and shut-off receiver 34 are mounted. Energy for operating the foregoing components is derived from the telephone lines as aforementioned connected to a terminal board 60 to which the telephone set is also connected as well as the condition sensor. Two of the terminals on the terminal board 60 are bridged by a jumper 62 as shown in FIG. 2 whereby the transmitter may be manually reset upon removal of the jumper as will be explained hereinafter in further detail. The frame 46 furthermore mounts an indicator 64 in order to signify or register withdrawal of energy from the telephone lines while the transmitter is in operation.

Figures 4, 5:
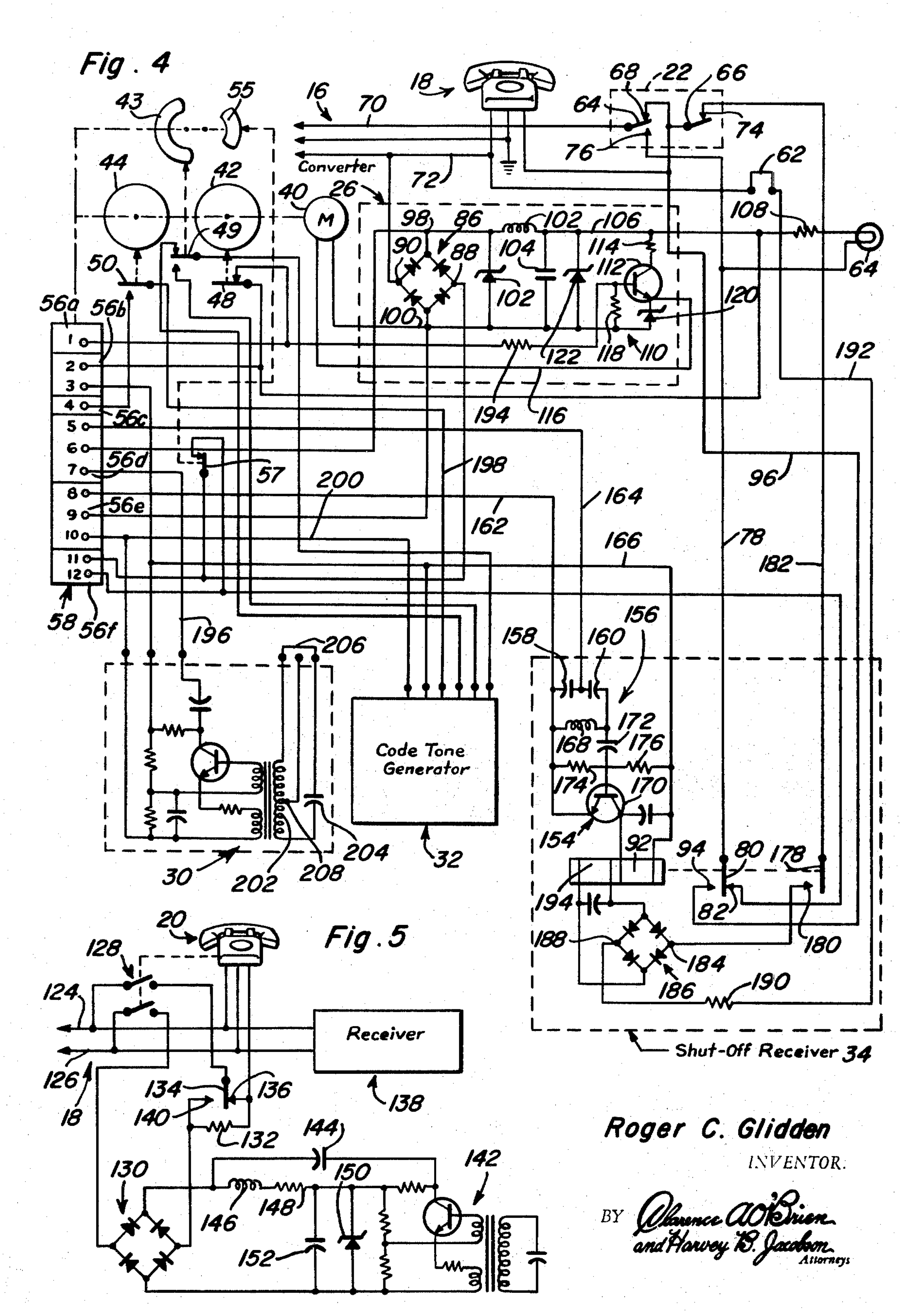
FIG. 4 is an electrical circuit diagram of the transmitter apparatus.
FIG. 5 is an electrical circuit diagram of associated apparatus at the receiving station.

FIG. 4 schematically illustrates the condition sensor 22 in the form of a pair of sensor switches 64 and 66. In the quiescent condition shown, switch 64 engages contact 68 to connect one of the telephone lines 70 to the telephone instrument 18 so that the telephone instrument will be connected across the telephone lines 70 and 72 for normal operation. The other sensor switch 66 in the quiescent condition, engages contact 74 connected to the shut-off receiver 34. When the sensor switches 64 and 66 are actuated, switch 66 is opened and switch 64 is disengaged from contact 68 and engages contact 76 in order to disconnect the telephone set 18 from the telephone line 70 which is then connected to the shut-off receiver 34 through conductor 78 connected to one side of the indicator 64. Conductor 78 is electrically connected through the relay switch 80 and normally engaged contact 82 to the converter 26 through terminal Nos. 11 and 12 and associated microswitch **56*f* in one of its operative positions. Thus, in response to the triggering of the sensor 22, normal operation of the telephone communication system is interrupted by disconnection of the telephone set 18 at the reporting station and connection of the telephone lines 70 and 72 to the converter component 26** through which energy is withdrawn from the telephone lines.

The converter component 26 includes a full wave rectifier 86 having an input terminal 88 connected to conductor 78 aforementioned and a second input terminal 90 connected to the telephone line 72. Thus, when the transmitting apparatus 10 is activated, the voltage across the telephone lines and the power transmitted therethrough is transferred to the transmitting apparatus through the rectifier 86. The transmitting apparatus will recycle until a relay drive pulse is applied to the latching relay coil 92 in the shut-off receiver 34 causing its relay switch 82 to disengage contact 82 and engage contact 94. The telephone line 70 will then be electrically connected to the telephone set 18 through the actuated sensor switch 64 and latched relay switch 80 by means of conductor 96 while power is removed from the converter 26 to stop recycling of the transmitter. The telephone instrument is thereby made available for normal voice communication.

When the transmitter 10 is activated by connection of the telephone lines to the input terminals of the rectifier 40, a d.c. voltage is established at the positive output terminal 98 of the rectifier and the negative voltage line 100 to which the drive motor 40 is connected. A Zener diode 102 is connected across the output terminals of the rectifier 86 in order to limit the peak signal voltages established during operation of the transmitter. The d.c. output voltage of the rectifier is furthermore filtered by an LC network including the series connected inductor 102 connected to the d.c. output terminal 98 and a capacitor 104 connected to the output side of the inductor and the negative voltage line 100. The output side of the inductor 102 thus supplies a d.c. voltage through the positive supply line 106 to the indicator lamp 64 in series with the load resistor 108 in order to signify withdrawal of energy from the telephone lines.

Dialing of the receiving station from the reporting station is regulated through a switching amplifier circuit generally referred to by reference numeral 110 which includes a transistor 112 arranged in an emitter follower configuration. The collector of the transmitter is connected by resistor 114 to the positive supply line 106 while its emitter is connected by conductor 116 to the drive motor 40 to which the negative voltage line 100 is also connected as aforementioned. Accordingly, when the transistor 112 is switched on, it completes an energizing circuit through the motor 40 to drive the switch actuators 42,43, 44 and 55 as well as the programmed actuator drum of the program control means 58. The transistor 112 is switched on by a forward biasing signal voltage supplied to its base from the pulse coder and programmer assembly. A potential difference between the base and the negative voltage line 100 is maintained by the resistor 118 in order to set the forward bias level of the transistor. Also, the d.c. voltage applied to the drive motor 40 is limited by a Zener diode 120 connected across the motor terminals in order to limit the maximum motor speed. Zener diode 122 connected across the positive and negative voltage lines 106 and 100, limits the supply voltage.

It will be apparent therefore, that the telephone lines will be rapidly loaded and unloaded by the motor under the control of transistor 60 which is switched on and off during the dialing period. Intermittent loading of the telephone lines by the motor will produce dialing pulses as explained in my prior co-pending application aforementioned which also explains how intermittent energization of the motor will accelerate and maintain operation by coasting during the non-energized intervals of the motor.

At the receiving station, the telephone instrument 20 as shown in FIG. 5 is connected to the telephone lines 124 and 126. Thus, when the receiving station is automatically dialed from a reporting station by the transmitter 10 and a person lifts the telephone handset in response to the ringing of the telephone instrument 20, communication is established through the central exchange network with the reporting station. The cradle switch 128 is then closed to connect the lines across a full wave rectifier 130 in series with a load resistor 132 through shut-off switch 134 in engagement with contact 136. The telephone lines 124 and 126 are thereby loaded. Tone bursts generated by the transmitter may then be heard during the message period and counted by means of any suitable receiver 138 as diagrammatically shown in FIG. 5 in order to identify the location from which the report is being received. If the person at the receiving station is unable to receive the complete coded message or if the receiver hand set is picked up too late to receive a complete message, hand set is merely recradled. The transmitter will then recycle after hang-up and thereby give the person at the receiving station an opportunity to receive a report once again. If the person is satisfied with the report, the switch 134 is actuated and momentarily held in engagement with contact 140 following the message period to thereby by-pass the load resistor 132. The telephone lines 124 and 126 at the receiving station will then be loaded through the rectifier 130 by an oscillator 142 having a predetermined frequency return signal output. Thus, the return signal output tone is fed to the positive terminal of the rectifier 130 through a signal coupling capacitor 144. The power terminals of the oscillator 142 are connected across the positive and negative terminals of the rectifier in series with an inductance coil 146 and coupling resistor 148 so as to avoid loading of the oscillating output signal of the oscillator by d.c. components. The rectifier itself renders the oscillator insensitive to voltage reversals across the telephone lines. The rectifier also presents a low a.c. impedance to the signal as d.c. current is applied to the oscillator at an input voltage limited by Zener diode 150 in parallel with capacitor 152 to prevent shunting of the output signals from the oscillator. Thus, the return tone signal is generated and applied to the telephone lines in order to stop recycling of the transmitter, as aforementioned.

Referring once again to FIG. 4, the return signal tone is applied to the amplifier 154 through a filter network 156 in the shut-off receiver 34, the return signal being routed to the shut-off receiver from the pulse coder and programmer assembly. The filter network includes a pair of capacitors 158 and 160 connected in series to a negative supply voltage line 162 and having a juncture therebetween to which a signal voltage line 164 is connected. The negative voltage line and signal line together with a positive voltage supply line 166 extend from the pulse coder and programmer assembly to the shut-off receiver in order to render the receiver operative and trigger it into operation. An inductor 168 is connected across the capacitors 158 and 160 to pass only a signal at the return tone frequency to the base of the amplifier transistor 170 through signal coupling capacitor 172. Base bias for the transistor is established at the juncture of the voltage divider resistors 174 and 176 connected in series between the negative and positive voltage supply lines 162 and 166. Thus, a proper return signal voltage on the base of the transistor renders the transistor 170 operative to conduct energizing current through the relay latching coil 92 aforementioned in order to automatically shut down the transmitter by actuating the relay switches 80 and 178. When relay switch 178 is latched in its actuated position it engages the normally open contact 180 in order to condition the transmitter for reset when the condition being monitored returns to normal as detected by the sensor 22.

The relay switch 178 is connected by conductor 182 to the contact 74 associated with the sensor so that when the sensor returns to its normal or quiescent condition as illustrated in FIG. 4, the telephone line 70 is electrically connected to one input terminal 184 of the full wave rectifier 186, the other input terminal 188 being connected by conductor 192 and jumper 62 to the telephone line 72. Thus, restoration of the sensor 22 to its normal position connects the telephone lines across the input terminals of the rectifier 186 in the shut-off receiver in order to supply energizing voltage to the unlatching relay coil 194 in order to reset the transmitter by unlatching the relay switches 80 and 178 so that they may return to the positions illustrated in FIG. 4. The foregoing reset occurs automatically when the sensor returns to its normal position. When the relay is unlatched and switch 178 opens the rectifier 186 and the unlatching coil 194 are deenergized so that the transmitter will be in condition for beginning a new operational cycle when triggered by the sensor 22. In the event that reset does not occur automatically as described, the transmitter may be manually reset by removing the jumper 62 to thereby disconnect the telephone line 72 from the rectifier 186 causing deenergization of the unlatching coil 194.

The dialing, code pulsing, signal routing and motor controlling functions as described in my prior co-pending application and cooperating with the components hereinbefore described in the present application, are performed by the pulse coder and programmer assembly which includes the aforementioned dial disc 42, code discs 43 and 44, program actuator drum 52 and associated microswitches 56 and 57. The arrangement of the present invention avoids the sliding contact arrangement disclosed in my prior co-pending application. Also, the code pulsing and programmer assembly of the instant invention controls operation of the guard tone generator 30 and shut-off receiver 34 in the manner hereinbefore described to provide a measure of security over and above that hereinbefore disclosed and claimed in my prior copending application.

FIG. 6 diagrammatically illustrates the six microswitches 56 exercizing the control functions through terminal Nos. 1 through 10, each microswitch being shown in one of two operative positions during each of the six revolutions of the dial and cod discs corresponding to one rotational cycle of the programming drum. Initially switch **56*f* opens terminal Nos. 11 and 12 while switch 56*a* connects terminal No. 1 to terminal No. 2 to short the dial tone pulsing switch 48 associated with the dial disc 42 and thereby holds the positive voltage line 106 connected by resistor 194 to the base of the transistor 112 for forward bias thereof, to energize the drive motor 40 The motor 40 thus advances the dial disc one revolution corresponding to a total initial interval of 10 seconds, for example, during which the telephone lines are loaded by the motor causing a drop in line voltage to await the dial tone signal. However, after the motor 40 is pulsed, the lines are open for 1 second by actuator 55 opening switch 57 connected in bypass relation to the microswitch 56*f* which is in an open condition during the first revolution of the program drum 52. The motor 40 coasts during the one second momentary opening of the lines after which the switch 57 closes to reestablish loading of the lines by the motor to complete the first revolution. During the second interval corresponding to the second revolution of the dial disc, the programmer drum has been advanced to a position displacing the dial control switch 56*a* to the second position shown in FIG. 6 disconnecting terminal Nos. 1 and 2 so that the dial pulsing switch 48 will intermittently pulse the motor 40 and produce the dialing pulses corresponding to the telephone number of the receiving station. Thus, the dialing operation is performed during the second period of the cycle. During the third period of the cycle, switch 56*a* is returned to its initial position at which it remains for the rest of the cycle to short out the dialing switch 48 and a second delay interval of 10 seconds ensues. The fourth period is begun with switch 56*b* being actuated. The third and fourth periods provide a total of 20 seconds for the called party to answer. Switch 56*b* then remains actuated until the end of the cycle and interconnects terminal Nos. 2 and 3, so that the voltage line 106 is connected to the positive voltage supply line 166 for the tone generators 30 and 32 and the shut-off receiver 34. The resulting output of the generator 30 is conducted by output line 196 to terminal No. 7 from which the output is fed by switch 56*c* during the message period through terminal No. 6 to the input terminal 98 of the rectifier 40 so as to transmit a steady guard tone signal at a first frequency ($f_1$) to the dialed station through the telephone lines. Switch 56*c* is then actuated to begin the fifth revolution or message period. At the same time, switch 49 in its initial position renders generator 32 operative at one of its two frequencies. The output of generator 32 at a second frequency ($f_2$) is conducted by its output line 198 to the code pulsing switch 50 from which the output is fed to terminal No. 4 associated with the code control switch 56*c* which is in its actuated position connecting terminal No. 4 to terminal No. 7. After 5 seconds, switch 49 is actuated to render generator 32 operative at its other frequency ($f_3$). The output of generator 32 sequentially at two different frequencies is puled by the code disc actuated pulsing switch 50, and superimposed on the steady output of generator 30 for transmission to the telephone lines during the message period. At the end of the message period, switches 56*d* and 56*e* are actuated for the remainder or sixth period of the cycle while switch 56*c* is returned to its initial position. Actuation of the switch 56*d* disconnects the output line 96 at terminal No. 7 from terminal No. 6 to terminate transmission of the generator outputs to the telephone lines. The telephone lines are then connected by rectifier 86 and terminal No. 6 through switch 56*d* to terminal No. 5 to transmit any return signal through signal line 164 to the shut-off receiver 34. Actuated switch 56*e* disconnects terminal Nos. 9 and 10 through which the negative voltage supply line 200 is connected to the generators in order to disable the same and apply the negative voltage to terminal No. 8 to which the negative voltage supply line 162** of the shut-off receiver is connected in order to render the shut-off receiver operative during the final control period of the cycle.

The tone generators 30 and 32 may be of the solid state type and identical in arrangement and operation to each other as shown in FIG. 4 except for the frequency values. As hereinbefore indicated, the outputs of both of the generators are applied simultaneously to the telephone lines at the reporting station during the message period. The output of the guard tone generator 30 is however continuous or steady in order to render receiving apparatus at the receiving station operative to receive the pulse coded information developed by the intermittent interruption in the output of the code tone generator 32 by the code pulsing switch 50 associated with the code disc 44. The tone frequency on the other hand is controlled by control disc 43. As shown in FIG. 4, each generator 30 and 32 has a signal coupling transformer winding 202. A frequency controlling capacitor 204 is connected to one of the end terminals of the winding. Accordingly when the end terminals of the winding are bridged by a jumper 206 for the generator 30, the single output frequency ($f_1$) is obtained. The end terminal of the winding 202 is connected to capacitor 204 by switch 49 in its initial position to condition generator 32 for operation at frequency ($f_2$). In the other position of switch 49, the capacitor is connected to a center tap 208 on the winding for operation of generator 32 at its other frequency ($f_3$).

FIG. 6 shows an input and output signal attentuator 210 connected across terminal Nos. 1 and 7, which is adjusted to meet telephone utility requirements and avoid overdrive on short telephone loops.

The foregoing is considered as illustrative only of the principles of the invention. Further since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. In combination with a telephone communication system having message lines across which a voltage is established at a reporting station, a transmitter comprising program control means for controlling withdrawal of energy from the message lines, converter means connecting the message lines to the program control means for operation thereof by said energy withdrawn from the message lines, said converter means including current controlling switch means connected to the program control means for controlling the loading of the message lines.

2. The combination of claim 1 wherein the program control means includes signal generator means rendered operative during a message period by said energy withdrawn from the message lines for generating code frequency signals, code pulsing means rendered operative simultaneously with said signal generator means for intermittently unloading the message lines during a dialing period preceding the message period and interrupting the code frequency signals intermittently during the message period, and signal path control means for changing signal paths between the converter and the signal generator means.

3. The combination of claim 2 including receiving means connected to the signal path control means for disconnecting the message lines from the converter means in response to a return signal during a cycle control period following the message period.

4. The combination of claim 3 wherein said signal generator means includes a pair of oscillators one of which transmits the signals continuously during the dialing and message periods while the other transmits the intermittently interrupted signals during the message period.

5. The combination of claim 4 wherein the signal path control means includes a plurality of microswitches and a programmed actuator driven in synchronization with the code pulsing means.

6. The combination of claim 2 wherein the signal path control means includes a plurality of microswitches and a programmed actuator driven in synchronization with the code pulsing means.

7. The combination of claim 6 wherein said signal generator means includes a pair of oscillators one of which transmits the signals continuously during the dialing and message periods while the other transmits the intermittently interrupted signals during the message period.

8. The combination of claim 2 wherein said signal generator means includes a pair of oscillators one of which transmits the signals continuously during the dialing and message periods while the other transmits the intermittently interrupted signals during the message period.

9. The combination of claim 1 including receiving means connected to the program control means for disconnecting the message lines from the converter means in response to a return signal during a cycle control period following the message period.

10. In combination with a telephone communication system having message lines across which a voltage is established, a transmitter including converter means connected to said message lines for controlling withdrawal of energy therefrom, code pulsing means operatively connected to the converter means for intermittent unloading of the message lines, an oscillator, and programmed means rendered operative by the code pulsing means during a message period for connecting the oscillator and the code pulsing means to the message lines to increase the loading thereof, said code pulsing means and the oscillator being operated by said energy withdrawn from the message lines.

11. The combination of claim 10 wherein said programmed means includes a plurality of microswitches, and actuator means driven by the code pulsing means for programmed actuation of the microswitches.

* * * * *